(12) United States Patent
Heard et al.

(10) Patent No.: US 8,600,592 B2
(45) Date of Patent: Dec. 3, 2013

(54) HOMING SYSTEM AND METHOD FOR AN AUTONOMOUS UNDERWATER VEHICLE

(75) Inventors: Garry J. Heard, Dartmouth (CA); Carmen E. Lucas, Dartmouth (CA); Nicos Pelavas, Dartmouth (CA); Derek A. Clark, Lower Sackville (CA); Gordon R. Ebbeson, Dartmouth (CA); Richard A. G. Fleming, Fall River (CA); George Schattschneider, Dartmouth (CA)

(73) Assignee: Her Majesty the Queen in Right of Canada as Represented by the Minister of National Defence, Ottawa, Ontario (CA)

( * ) Notice: Subject to any disclaimer, the term of this patent is extended or adjusted under 35 U.S.C. 154(b) by 0 days.

(21) Appl. No.: 13/532,872

(22) Filed: Jun. 26, 2012

(65) Prior Publication Data
US 2013/0231802 A1    Sep. 5, 2013

Related U.S. Application Data

(63) Continuation of application No. 13/410,511, filed on Mar. 2, 2012.

(51) Int. Cl.
*G01S 5/18*    (2006.01)

(52) U.S. Cl.
USPC ............. 701/21; 367/131; 367/133; 367/149; 367/5; 367/6; 342/357.45; 342/357.58; 318/589; 340/855.6

(58) Field of Classification Search
USPC ............. 367/133, 149, 5, 6, 131; 342/357.45; 342/357.58; 701/21; 318/589
See application file for complete search history.

(56) References Cited

U.S. PATENT DOCUMENTS

| | | | |
|---|---|---|---|
| 5,119,341 A * | 6/1992 | Youngberg | 367/5 |
| 5,363,343 A | 11/1994 | Klein | |
| 5,579,285 A * | 11/1996 | Hubert | 367/133 |
| 5,686,694 A * | 11/1997 | Hillenbrand et al. | 114/21.2 |
| 6,163,503 A * | 12/2000 | Gudbjornsson | 367/6 |
| 6,532,192 B1 * | 3/2003 | Reid | 367/127 |
| 7,139,647 B2 * | 11/2006 | Larsen | 701/21 |
| 7,760,587 B2 * | 7/2010 | Abbot et al. | 367/131 |
| 8,203,911 B2 * | 6/2012 | Kremeyer | 367/149 |
| 8,385,821 B2 * | 2/2013 | Rhodes et al. | 455/40 |
| 2010/0302901 A1 | 12/2010 | Welker et al. | |
| 2011/0090762 A1 * | 4/2011 | Rhodes et al. | 367/131 |
| 2012/0137949 A1 * | 6/2012 | Vosburgh | 114/330 |

OTHER PUBLICATIONS

Austin T. C., et al., "RATS" a Relative Acoustic Tracking System Developed for Deep Ocean Navigation, OCEANS 97.MTS/IEEE Conference Proceedings, Oct. 1997, vol. 1, pp. 535-540.

(Continued)

*Primary Examiner* — Thomas Black
*Assistant Examiner* — Wae Louie
(74) *Attorney, Agent, or Firm* — Kent Daniels; Daniels IP Services Ltd.

(57) ABSTRACT

A submarine homing system includes an acoustic emitter configured to emit an acoustic signal comprising at least two narrow-band tones, each narrow-band tone having a respective predetermined center frequency. An acoustic receiver is configured to receive the acoustic signal from the acoustic emitter, and produce one or more receiver signals. A processor is operatively connected to the acoustic receiver. The processor is configured to process the receiver signals to calculate a direction between the acoustic receiver and the acoustic emitter.

16 Claims, 2 Drawing Sheets

(56) References Cited

OTHER PUBLICATIONS

Dowdeswell, et al., Autonomous underwater vehicles (AUVs) and investigations of the ice-ocean interface: deploying the Autosub AUV in Antarctic and Arctic waters, Journal of Glaciology, 54(187), pp. 661-672.

Edwards, D.B., et al., A Leader-Follower Algorithm for Multiple AUV Formation, 2004, IEEE, pp. 107.

Forrest, A.L., et al., Investigation of under-ice thermal structure: small AUV deployment in Pavilion Lake, BC, Canada, OCEANS 2007, IEEE, Oct. 2007, pp. 1-9.

Aoki, et al. Deep and Long Range AUV "Urashima", Proceedings of the Eleventh (2001) International Offshore and Polar Engineering Conference, Jun. 2001, pp. 314-320.

Rauch, et al., AUV Deployment Marking and Homing to Targets, IEEE, pp. 1-5.

Baccou, et al. Homing and navigation using one transponder for AUV, post-processing comparisons results with Long Base-Line navigation, Proceedings of the 2002 IEEE International Conference on Robotics & Automation, May 2002, pp. 4004-4009.

Ferguson, et al., Theseus AUV—Two Record Breaking Missions, Sea Technology, pp. 1-4.

\* cited by examiner

HOMING SYSTEM AND METHOD FOR AN AUTONOMOUS UNDERWATER VEHICLE

CROSS-REFERENCE TO RELATED APPLICATIONS

This application is a continuation application of U.S. patent application Ser. No. 13/410,511 filed Mar. 2, 2012, the entire content is hereby incorporated herein by reference.

MICROFICHE APPENDIX

Not Applicable.

TECHNICAL FIELD

The present invention relates generally to a homing systems for use in a marine environment, and particular to systems and methods for long range homing of autonomous underwater vehicles.

BACKGROUND

Autonomous underwater vehicles (AUV's) are used in a variety of marine environments to explore beneath the water's surface. For example, AUV's may be used to perform marine surveys and to explore geological features of a sea bed as well as take various measurements of the underwater environment. AUV's are typically operated by a controller that may be installed on a ship. The ship controlling the AUV's mission may be referred to as a controller ship. The controller may be stationed at the surface of the water near to the area that the AUV is exploring. The controller may also assist with entry and extraction of the AUV into the marine environment. The AUV may be lowered into the water by the controller ship. When the AUV has completed its mission, it will typically return to the controller ship for recovery. The AUV may be given an acoustic homing signal in order for the AUV to navigate to the controller ship for recovery.

Recently, with advances in AUV technology and in particular, advances in fuel cells, underwater vehicles may travel for tens or even hundreds of kilometers before they must be re-fuelled. Hence, AUV's may be, at times, great distances from a controller ship. For example, an AUV may travel 50 kilometers from a controller ship. The controller ship may be immobile or it may be disadvantageous for the controller ship to move depending on the conditions of the marine environment. For example, when exploring in the arctic, it may be necessary to introduce an AUV into the water through a hole in an ice sheet. With thick ice covering, it may be impracticable for a ship to follow the AUV. Moreover, with a thick ice covering, the controller ship may drift with the ice flow, so that the AUV must navigate to a location for retrieval that is some distance from the point of launch. Hence, the homing system used to extract the AUV from the water must allow for transmission over reasonably large distances.

As is known in the art, low frequency acoustic signals suffer lower attenuation than high frequency acoustic signal, and so are favoured for use in long range homing systems. However, low frequency homing signals may coincide with the frequencies that are generated by other acoustic sources in the water (such as wave action, ships or wild-life). The AUV may become lost if it attempts to follow a false homing signal.

Techniques that overcome deficiencies in existing homing systems remain highly desirable.

SUMMARY

A submarine homing system comprises an acoustic emitter configured to emit an acoustic signal comprising at least two narrowband tones, each narrowband tone having a respective predetermined center frequency. The homing system further comprises an acoustic receiver configured to receive the acoustic signal from the acoustic emitter, and to produce one or more receiver signals. A processor is communicably coupled to the acoustic receiver and is configured to process the receiver signals to calculate the direction from which the acoustic signal was received by the acoustic receiver.

BRIEF DESCRIPTION OF THE DRAWINGS

Embodiments will now be described by way of example only with reference to the appended drawings wherein.

It will be noted that throughout the appended drawings, like features are identified by like reference numerals.

DETAILED DESCRIPTION

Figure 1:
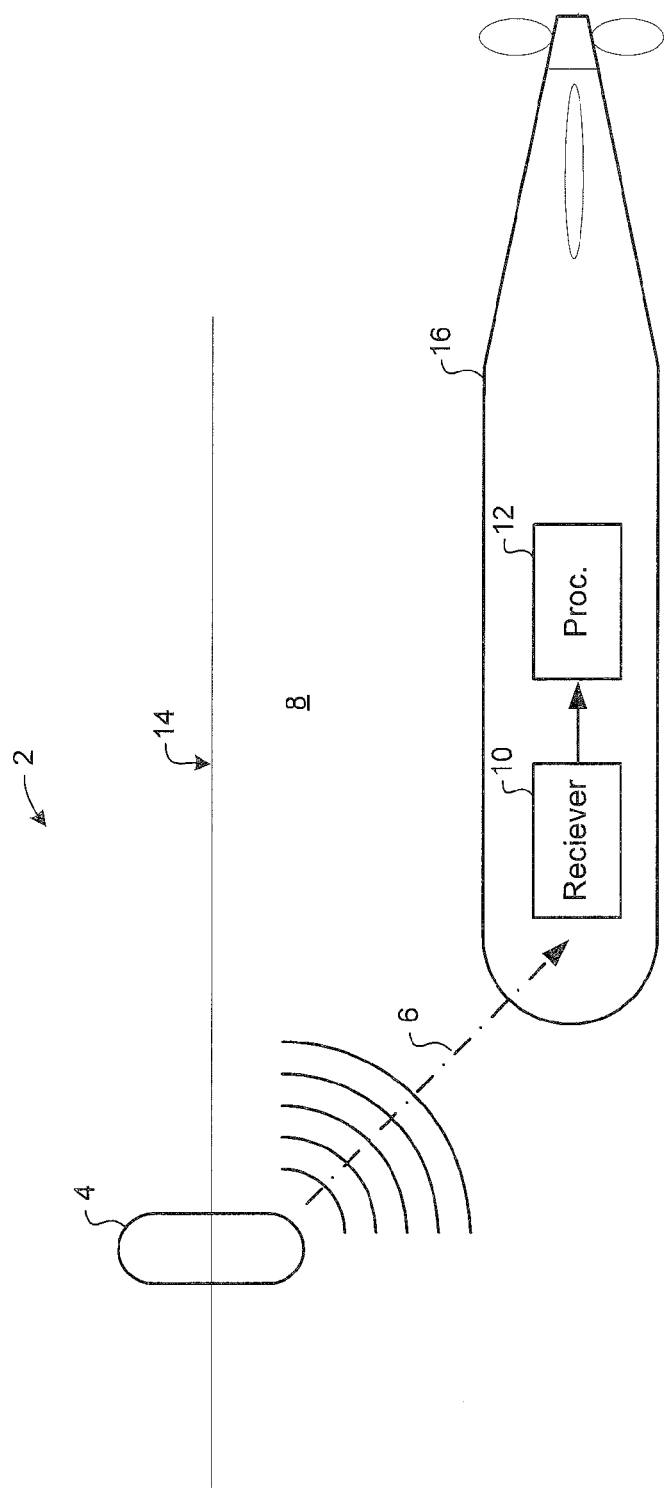
FIG. 1 is a block diagram schematically illustrating principal elements of a submarine homing system in accordance with a representative embodiment of the present invention.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein.

Turning to FIG. 1, there is shown a system 2 comprising an acoustic emitter 4 configured to emit an acoustic signal 6 into a body of water 8, comprising at least two narrow-band tones, each narrow-band tone having a respective predetermined center frequency; a receiver 10 configured to receive acoustic signals and produce corresponding receiver signals; and a processor 12 configured to analyse the receiver signals to calculate at least a direction from which the acoustic signal 6 was received by the receiver 10. Each of these elements may be constructed of any suitable combination of hardware and software. Such construction details are considered to be well within the purview of persons of ordinary skill in the art, and thus will not be described in detail herein.

The body of water 8 may be referred to interchangeably as a marine environment, and may be a lake, river or ocean, or any other body of water in which an acoustic homing signal may be used.

The acoustic emitter 4 may be configured as any suitable combination of hardware and software configured to emit the acoustic signal 6 into the body of water, and may have any suitable form (e.g. sonobouy etc.). In some embodiments, the acoustic emitter 4 may comprise a Super Subcomms Multi-Mode Pipe Projector (SSMMPP), which is known in the art. The SSMMPP is capable of generating a nearly omni-directional acoustic field having an intensity of 190 dB at 1370 Hz. The acoustic emitter 4 may be configured to operate at or near the water surface 14, or may be lowered to a desired depth below the surface. It is contemplated that the acoustic emitter 4 will normally be associated with a controller ship or vessel being used to retrieve an Autonomous Underwater Vehicle (AUV), but this is not essential. More generally, the acoustic emitter 4 may be used in any application where it is desired to provide an acoustic beacon that can be reliably detected by the receiver at long range.

The receiver 10 and processor 12 will normally be incorporated in an Autonomous Underwater Vehicle (AUV) 16, as shown in FIG. 1. However, this is not essential. More generally, the receiver and processor may be used in any application in which it is desired to detect an acoustic beacon at a long range from the emitter, and calculate a direction back toward the emitter.

As noted above, the acoustic signal 6 comprises a combination of at least two low-frequency narrowband tones. More generally, the emitter 4 may emit an acoustic signal comprising a combination of n (where n is an natural number, n≥2) low-frequency narrowband tones, which are selected from a set of m (where m is a natural number) possible tones. The number of possible tones, m, is primarily dependent on the range of frequencies over which the acoustic emitter 4 is designed to operate, as well as the desired spacing between the center frequencies of each of the possible tones. By way of example, if the acoustic emitter 4 emits at frequencies between 1000 Hz and 1800 Hz, and the spacing between the center frequencies of each tone is 50 Hz, m would be 17.

Figure 2:
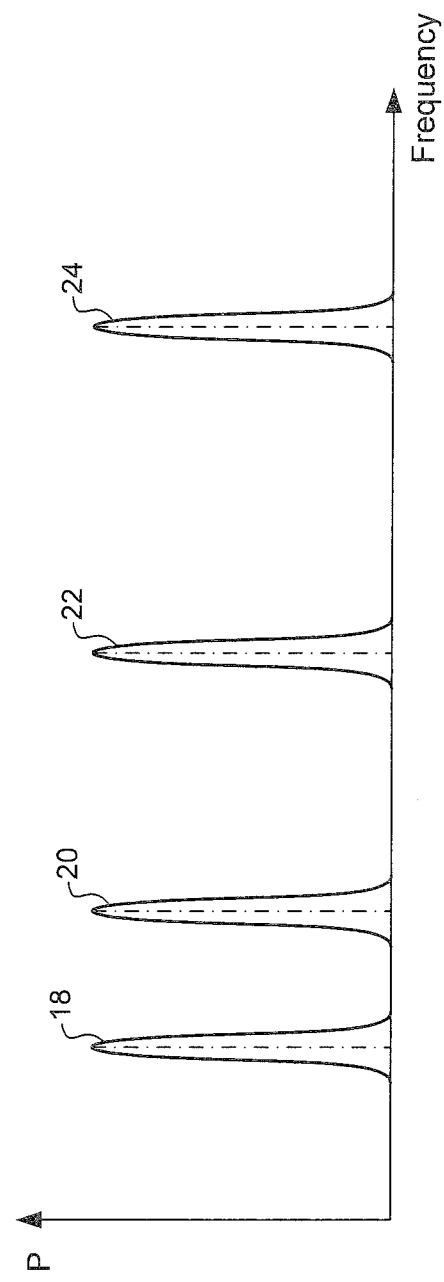
FIG. 2 is a chart schematically illustrating a representative tone combination usable in the submarine homing system of FIG. 1.

FIG. 2 illustrates an example combination of n=4 tones 18-24 The band-width of each tone will typically be a function of the respective wave-function of each tone. Any desired wave-function may be used, including, without limitation, square-wave, triangular wave, saw-tooth, sinusoidal and combinations thereof. Preferably, the tones 18-24 forming a given combination are selected such that each of the tones can be readily distinguished from the other tones at the receiver 10. Preferably, the frequency range or width of each tone is minimized so as to limit dispersive effects in the marine environment 8. In some embodiments, each tone 18-24 is composed of a pure-tone sinusoidal signal.

In some embodiments, each of the n tones 18-24 of a given combination are emitted sequentially in time, and in a predetermined order. In such embodiments, the order in which the tones are emitted is preferably selected such that the time series of tones in any given combination is unique, at least among a set of possible tone combinations that can be emitted by a given emitter 4. For example, the number of possible n=4 tone combinations is (n−1)!=6, meaning that 6 unique combinations (of n=4 tones each) can be constructed in which no tone combination is a mere rotation of any other tone combination in the set. This enables the processor 12 to use known signal processing techniques to detect the time series of tones in the noisy acoustic signal received by the receiver 10 and so identify the specific tone combination being sent by the emitter 4.

In other embodiments, the n tones of a given combination may be emitted simultaneously. In such embodiments, the center frequency of each tone within a given tone combination is preferably selected to minimize interference with the other tones of that tone combination. This enables the processor 12 to use known signal processing techniques to identify the specific tone combination in the acoustic signal received by the receiver 10. Thus, for example, the processor 12 can distinguish the acoustic signal 6 from noise arising from other sources in the marine environment 8, including broadband noise from passing ships.

In some embodiments, one or more tone combinations may encode information. For example, in some embodiments, a selected tone combination may be used as an identifier associated with either the emitter 4 or the receiver 10. With this arrangement, the processor 12 can use known signal processing techniques to identify a desired one acoustic signal 6 from among two or more acoustic signals received by the receiver 10. Thus, for example, the AUV 16 may operate in a marine environment 8 in which two or more emitters 4 are being used. When each emitter 4 is controlled to emit a respective acoustic signal having a unique identifier (tone combination), the processor 12 can identify and use the respective acoustic signal 6 from a selected one of the emitters 4. In some embodiments, a selected tone combination may be used as a command. With this arrangement, the acoustic signal can be used to trigger desired behaviours of a AUV associated with the receiver 10 and processor 12.

The acoustic receiver 10 generates a set of one or more receiver signals indicative of the local acoustic field in the vicinity of the receiver 10. This local acoustic field will normally include the acoustic signal emitted from the emitter 4 and noise from other acoustic sources in the marine environment. In some embodiments, the acoustic receiver 10 comprises a plurality of acoustic transducers (such as, for example, acoustic hydrophones) arranged such that the receiver signals contain information that can be used to calculate a direction from which a received acoustic signal was received. One possible arrangement capable of this operation comprises seven acoustic transducers arranged in three orthogonal 3-element arrays, wherein each of the orthogonal arrays shares a common center transducer. With this arrangement, each 3-element array generates respective detector signals that are indicative of the acoustic field component in a respective orthogonal axis, so that the direction from which a selected acoustic signal was received can be calculated from the relative intensities of the respective detector signals obtained from each of the three arrays. For example, the processor 12 may process the respective detector signals from each array, as described above, to identify the desired acoustic signal and determine the intensity of that acoustic signal as detected by each transducer array. The respective intensities of the desired acoustic signal detected by the three arrays can then be used to calculate the direction (e.g. horizontal and vertical angles) from which the desired acoustic signal was received. Multi-element transducer arrays of the type described are known in the art, and so will not be further described herein.

In an embodiment in which one or more tone combinations are used to encode information in the form of commands, the processor 12 may also operate to compare the tone combination of the received acoustic signal to a set of predetermined tone combinations (for example stored in a memory), to identify a specific command encoded in the acoustic signal. The identified command can then be passed to a controller unit of the AUV 16 for execution.

Although the above has been described with reference to certain specific example embodiments, various modifications thereof will be apparent to those skilled in the art without departing from the scope of the claims appended hereto.

The invention claimed is:

1. A submarine homing system comprising:
   an acoustic emitter configured to emit an acoustic signal comprising at least two narrow-band tones, each narrow-band tone having a respective predetermined center frequency; and
   an autonomous underwater vehicle (AUV) comprising:
   an acoustic receiver configured to receive the acoustic signal from the acoustic emitter, and produce one or more receiver signals;
   a processor operatively connected to the acoustic receiver, the processor being configured to process the receiver signals to calculate a direction between the acoustic receiver and the acoustic emitter; and a control system responsive to the processor to cause the AUV to follow a desired path relative to the calculated direction between the acoustic receiver and the acoustic emitter.

2. The submarine homing system of claim 1 wherein the respective predetermined center frequency of each narrow-band tone is less than 2000 Hz.

3. The submarine homing system of claim 1 wherein the respective predetermined center frequency of a first one of the narrow-band tones is selected to avoid interference with the respective predetermined center frequency of a second one of the narrow-band tones.

4. The submarine homing system of claim 1 wherein the at least two narrow-band tones of the acoustic signal are emitted simultaneously.

5. The submarine homing system of claim 1 wherein the at least two narrow-band tones of the acoustic signal are emitted sequentially.

6. The submarine homing system of claim 5 wherein the at least two narrow-band tones of the acoustic signal are emitted in a predetermined sequence having a selected repetition period.

7. The submarine homing system of claim 6 wherein the predetermined sequence encodes information.

8. The submarine homing system of claim 7 wherein the information comprises any one or more of: a status indication, an identifier, and a command.

9. A method of submarine homing, the method comprising the steps of:
emitting an acoustic signal comprising at least two narrow-band tones, each narrow-band tone having a respective predetermined center frequency; and
in an autonomous underwater vehicle (AUV):
receiving the acoustic signal emitted by the acoustic emitter, and producing one or more receiver signals;
processing the receiver signals to calculate a direction between the acoustic receiver and the acoustic emitter; and
a control system causing the AUV to follow a desired path relative to the calculated direction between the acoustic receiver and the acoustic emitter.

10. The method of claim 9, the method further comprising emitting the respective predetermined center frequency of each narrow-band tone at less than 2000 Hz.

11. The method of claim 9, the method further comprising selecting the respective predetermined center frequency of a first one of the narrow-band tones to avoid interference with the respective predetermined center frequency of a second one of the narrow-band tones.

12. The method of claim 9, the method further comprising emitting the at least two narrow-band tones of the acoustic signal simultaneously.

13. The method of claim 9, the method further comprising emitting the at least two narrow-band tones of the acoustic signal sequentially.

14. The method of claim 13, the method further comprising emitting and repeating the at least two narrow-band tones of the acoustic signal in a predetermined sequence and having a selected repetition period.

15. The method of claim 14, the method further comprising encoding information in the predetermined sequence of information.

16. The method of claim 15, wherein the information comprises any one or more of a status indication, an identifier, and a command.

* * * * *